(12) United States Patent
Cairns et al.

(10) Patent No.: US 7,364,448 B2
(45) Date of Patent: Apr. 29, 2008

(54) CONNECTOR INCLUDING CIRCULAR BLADDER CONSTRICTION AND ASSOCIATED METHODS

(75) Inventors: James L. Cairns, Ormond Beach, FL (US); Stewart M. Barlow, Ormond Beach, FL (US)

(73) Assignee: Ocean Design, Inc., Daytona Beach, FL (US)

( * ) Notice: Subject to any disclaimer, the term of this patent is extended or adjusted under 35 U.S.C. 154(b) by 0 days.

(21) Appl. No.: 11/279,474

(22) Filed: Apr. 12, 2006

(65) Prior Publication Data

US 2007/0243739 A1 Oct. 18, 2007

(51) Int. Cl.
*H01R 4/64* (2006.01)
(52) U.S. Cl. ..................................... 439/201
(58) Field of Classification Search ............... 439/201, 439/191–200, 202–206; 385/56, 58
See application file for complete search history.

(56) References Cited

U.S. PATENT DOCUMENTS

| 4,666,242 | A |   | 5/1987 | Cairns |  |
|---|---|---|---|---|---|
| 4,948,377 | A | * | 8/1990 | Cairns | 439/200 |
| 5,162,617 | A | * | 11/1992 | Ferbas | 174/138 F |
| 5,194,012 | A | * | 3/1993 | Cairns | 439/201 |
| 5,203,805 | A | * | 4/1993 | Cairns | 439/199 |
| 5,645,438 | A | * | 7/1997 | Cairns | 439/139 |
| 5,645,442 | A | * | 7/1997 | Cairns | 439/201 |
| 5,722,842 | A | * | 3/1998 | Cairns | 439/139 |
| 5,772,457 | A | * | 6/1998 | Cairns | 439/201 |
| 5,873,750 | A | * | 2/1999 | Cairns et al. | 439/587 |
| 6,017,227 | A | * | 1/2000 | Cairns et al. | 439/138 |
| 6,067,395 | A | * | 5/2000 | Cairns et al. | 385/138 |
| 6,315,461 | B1 | * | 11/2001 | Cairns | 385/56 |
| 6,321,021 | B1 |   | 11/2001 | Cairns |  |
| 6,332,787 | B1 | * | 12/2001 | Barlow et al. | 439/138 |
| 6,464,405 | B2 | * | 10/2002 | Cairns et al. | 385/56 |
| 6,736,545 | B2 | * | 5/2004 | Cairns et al. | 385/56 |
| 6,796,821 | B2 | * | 9/2004 | Cairns et al. | 439/204 |
| 6,910,910 | B2 | * | 6/2005 | Cairns | 439/352 |
| 7,112,080 | B2 | * | 9/2006 | Nicholson | 439/283 |
| 7,244,132 | B1 | * | 7/2007 | Cairns et al. | 439/191 |
| 2002/0003931 | A1 | * | 1/2002 | Cairns et al. | 385/56 |
| 2003/0007738 | A1 | * | 1/2003 | Cairns et al. | 385/56 |
| 2005/0042903 | A1 | * | 2/2005 | Nicholson | 439/201 |

\* cited by examiner

*Primary Examiner*—Gary F. Paumen
(74) *Attorney, Agent, or Firm*—Frocopio, Cory, Hargreaves & Savitch LLP

(57) ABSTRACT

A connector may include first and second connector portions being movable between unmated and mated positions. First and second bladders may be in respective first and second connector portions and cooperate therewith so that opposing ends of the first and second bladders are urged together and moved from a closed to an open position as the first and second connector portions are moved from the unmated to the mated position. At least one of the first and second connector portions may define a circular constriction for closing an end of a respective bladder into a circular peripheral shape when the first and second connector portions are in the unmated position. One or both of the bladder ends may define a generally rectangular aperture when in the open position.

30 Claims, 7 Drawing Sheets

CONNECTOR INCLUDING CIRCULAR BLADDER CONSTRICTION AND ASSOCIATED METHODS

FIELD OF THE INVENTION

The invention relates to the field of connectors, and, more particularly, to electrical and/or optical connectors and related methods.

BACKGROUND OF THE INVENTION

Underwater cables are commonly used to carry electrical power and/or signals. There is a need to make connections between adjacent cable ends, or between a cable end and associated equipment, for example. Accordingly, there are also submersible cable connectors for such hostile or underwater, high pressure environments. Such cable connectors not only have to operate under extreme conditions, but for some applications they may need to be mateable while submerged, that is, wet-mateable. A submersible robotic device may also be used to mate and demate the wet-mateable cable connector portions.

The assignee of the present invention, Ocean Design, Inc. of Daytona Beach, Fla., has developed various significant improvements in wet-mateable connectors as disclosed in U.S. Pat. Nos. 4,948,377; 5,162,617; 5,194,012; 5,203,805; 5,645,438; 5,645,442; 5,772,457; 5,722,842; 5,873,750; 6,017,227; 6,067,395; 6,315,461; 6,332,787; 6,464,405; 6,736,545; 6,796,821; and 6,910,910, for example. The entire content of each of these patents is incorporated herein by reference.

One line of wet-mateable connectors is of the type as described in U.S. Pat. No. 6,736,545, for example. The patent discloses a wet-mateable connector comprising first and second connector portions being movable between unmated and mated positions. In addition, the connector also includes first and second bladders in respective connector portions and cooperating therewith so that opposing ends of the bladders are sealably urged together and moved from a closed to an open position as the connector portions are moved from the unmated to the mated position.

More particularly, the first connector portion includes a first tubular shell including interior portions defining a fixed oval constriction. The second connector portion comprises a second tubular shell and an actuator slidable therein and defining a slidable oval constriction. The second bladder is extended longitudinally beyond the slidable and fixed oval constrictions and into the interior of the first shell when the connector portions are moved to the mated position. This mating action causes the ends of the bladders to move to the open position, yet provides a seal therebetween to surrounding water, to permit engagement of contacts. Conversely, the bladders are closed to seal the respective contacts from the surrounding water when the connector is moved to the unmated position. Commercial versions of this wet-mateable connector are offered from Ocean Design, Inc. of Daytona Beach, Fla. under the designation I-CONN.

One disadvantage of the type of wet-mateable connector as disclosed in U.S. Pat. No. 6,736,545 is that the manufacturing of the tapered, oval-shaped, fixed or sliding constriction is relatively complicated. Another disadvantage is that the shape of the opening in the ends of the bladders may not be large enough when open to use higher fiber counts, for example.

SUMMARY OF THE INVENTION

In view of the foregoing background, it is therefore an object of the invention to provide a connector that is readily manufactured and may provide an increased signal carrying capacity, such as particularly, but not exclusively, for submersible applications.

This and other objects, features, and advantages in accordance with the invention are provided by a connector that may comprise first and second connector portions being movable between unmated and mated positions, and wherein a circular constriction may be used for one and/or both of the bladders. More particularly, first and second bladders may be in respective first and second connector portions and cooperate therewith so that opposing ends of the first and second bladders are urged together and moved from a closed to an open position as the first and second connector portions are moved from the unmated to the mated position. At least one of the first and second connector portions may define a circular constriction for closing an end of a bladder into a circular peripheral shape when the first and second connector portions are in the unmated position. Accordingly, a cable connector is provided that may be readily manufactured, and that performs well in harsh environments.

The first connector portion may comprise a first tubular shell including interior portions defining a fixed frustoconical constriction terminating in a first circular constriction. The second connector portion may comprise a second tubular shell and an actuator slidable therein and defining a slidable frustoconical constriction terminating in a second circular constriction. The second bladder may extend longitudinally beyond the slidable and fixed frustoconical constrictions and into the interior of the first tubular shell when the first and second connector portions are in the mated position so that the first and second bladders are in the open position.

In accordance with another feature of the connector, at least one of the opposing ends of the first and second bladders may define a generally rectangular aperture when in the open position. At least one of the opposing ends of the first and second bladders may define a series of closed slits when in the closed position. For example, the series of closed slits may comprise a medial closed slit and a pair of diverging V-shaped closed slits extending from opposite ends of the medial closed slit.

Each of the first and second connector portions may comprise a base, a tubular shell extending outwardly from the base, and at least one mateable electrical and/or optical contact carried by the base within a respective bladder. The connector may further comprise a dielectric contained within each of the first and second the bladders.

A method aspect of the invention is for making a connector. The method may include forming first and second bladders to be positioned in respective first and second connector portions and cooperating therewith so that opposing ends of the first and second bladders are urged together and moved from a closed to an open position as the first and second connector portions are moved from an unmated to a mated position. The method may further include forming the first and second connector portions to be movable between the unmated and mated positions and so that at least one of the first and second connector portions defines a circular constriction for closing an end of a respective bladder into a circular peripheral shape when the first and second connector portions are in the unmated position.

Another method aspect is also for making a connector and may include forming first and second bladders to be positioned in respective first and second connector portions and cooperating therewith so that opposing ends of the first and second bladders are urged together and moved from a closed to an open position as the first and second connector portions are moved from an unmated to a mated position. Moreover, at least one opposing bladder end may define a generally rectangular aperture when in the open position and may also define a series of closed slits when in the closed position.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-5, a connector 10, such as for submersible applications, and in accordance with the invention is now described. The connector 10 comprises first and second connector portions 12a, 12b being movable between unmated (FIG. 1) and mated positions (FIG. 2) as will be appreciated by those of skill in the art. First and second bladders 14a, 14b are contained in respective first and second connector portions 12a, 12b and cooperate therewith so that opposing ends 16a, 16b of the first and second bladders are urged sealably together and moved from a closed position (FIG. 4) to an open position (FIG. 5) as the first and second connector portions are moved from the unmated to the mated position, for example. The opposing ends 16a, 16b of the bladders 14a, 14b may move from the closed position to the open position based upon the shape memory of the bladder material, and as the ends move from their respective constrictions explained in greater detail below.

Conversely, when the connector portions 12a, 12b are moved to the unmated position, the bladders 14a, 14b move from the opened to the closed position. The ends 16a, 16b of the bladders 14a, 14b remain sealably urged together until the operation is complete. One or both of the bladders 14a, 14b may have a unitary structure or may be formed of multiple components as will be appreciated by those skilled in the art.

Figure 1:
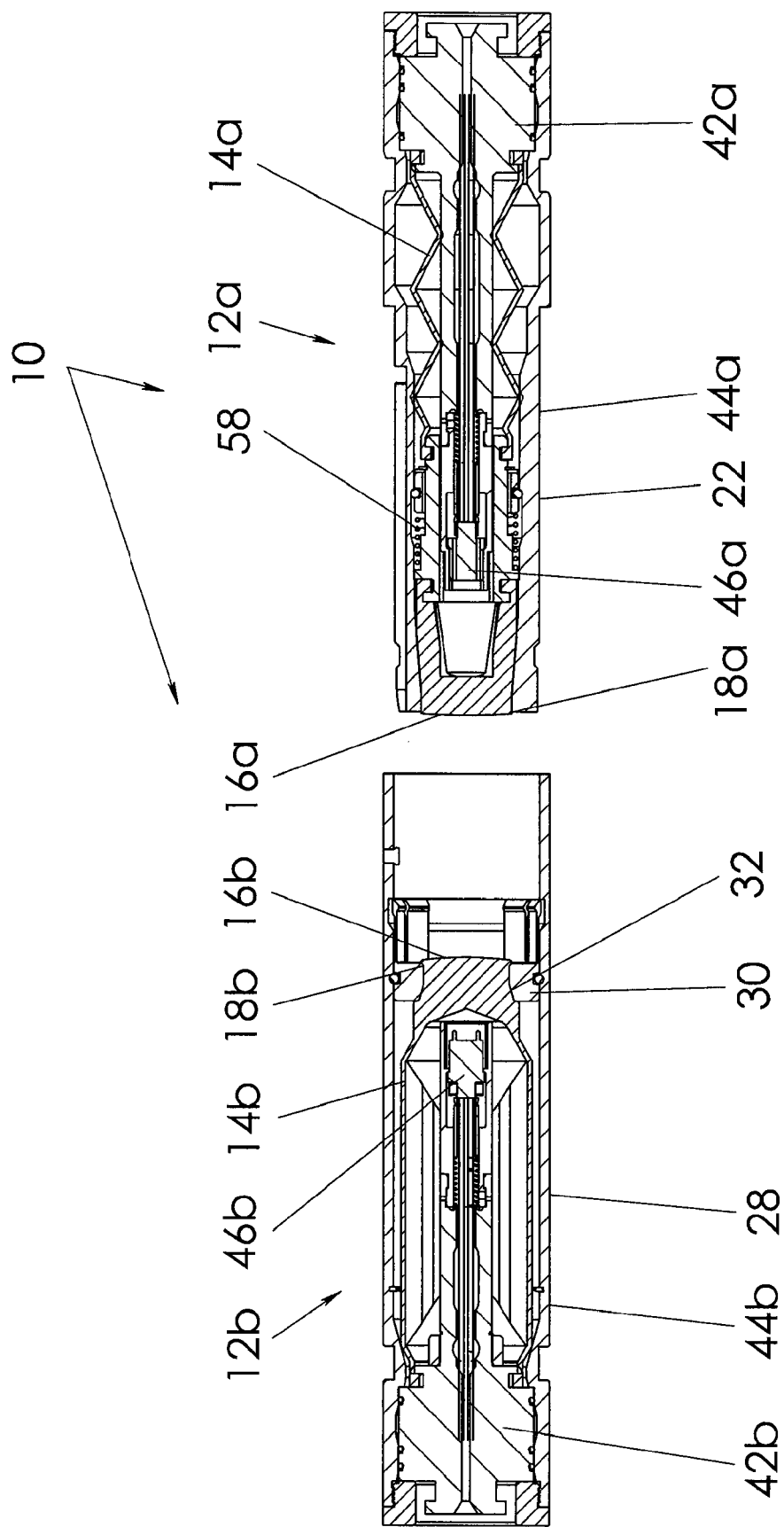
FIG. 1 is a longitudinal cross-sectional view of a connector in accordance with the invention shown in the unmated position.

In the illustrated embodiment, each of the first and second connector portions 12a, 12b has a circular constriction 18a, 18b for closing an end 16a, 16b of a respective bladder 14a, 14b into a constricted circular peripheral shape (FIG. 4) when the first and second connector portions are in the unmated position of FIG. 1. Accordingly, the connector 10 may be more easy to manufacture, and may still perform well in harsh environments.

Figure 2:
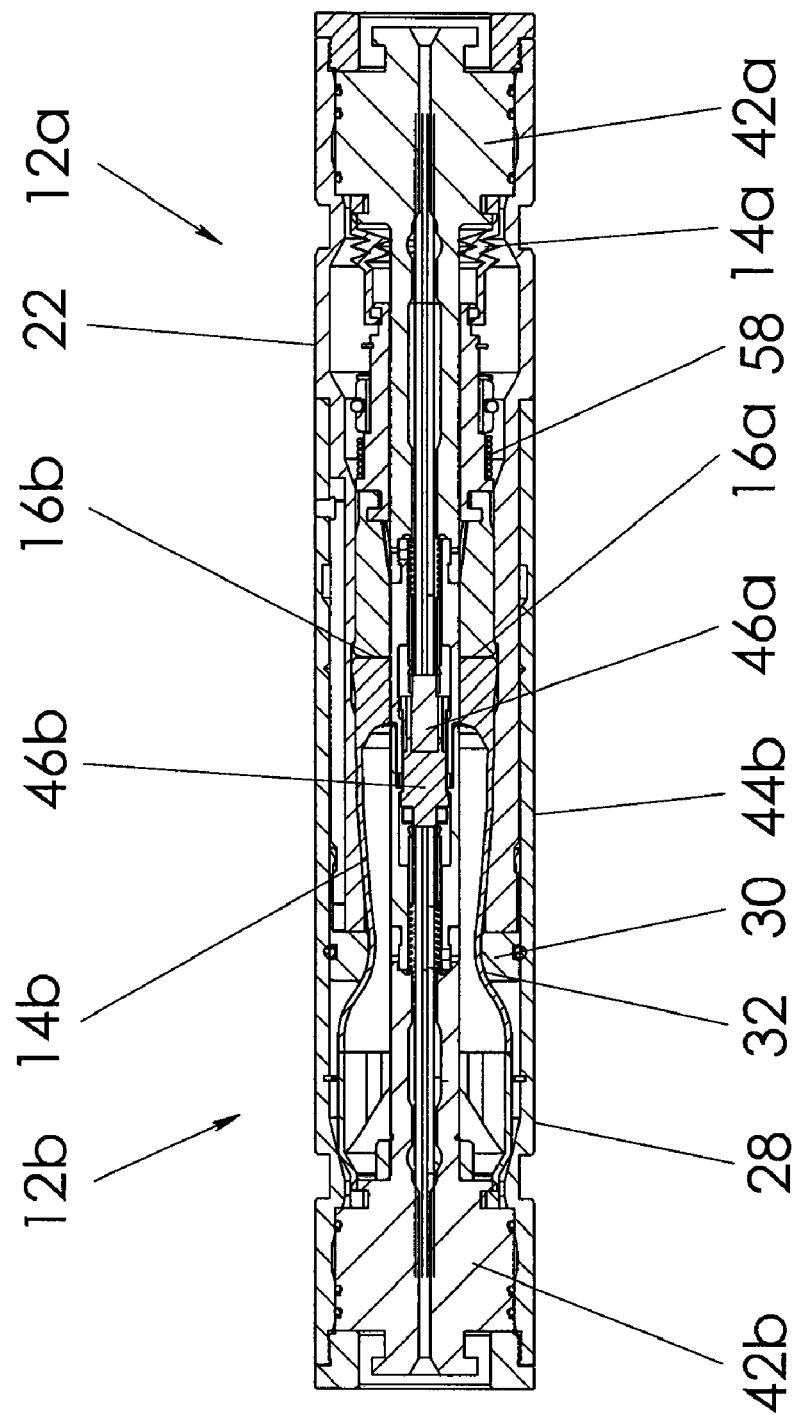
FIG. 2 is a longitudinal cross-sectional view of the connector of FIG. 1 shown in the mated position.
Figure 3:
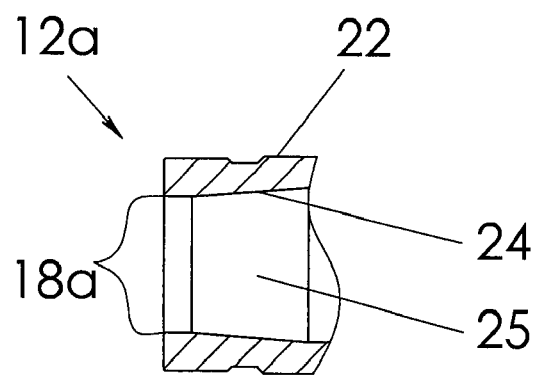
FIG. 3 is an enlarged longitudinal cross-sectional view of a portion of the fixed frustoconical constriction of the connector of FIG. 1.
Figures 4, 5:
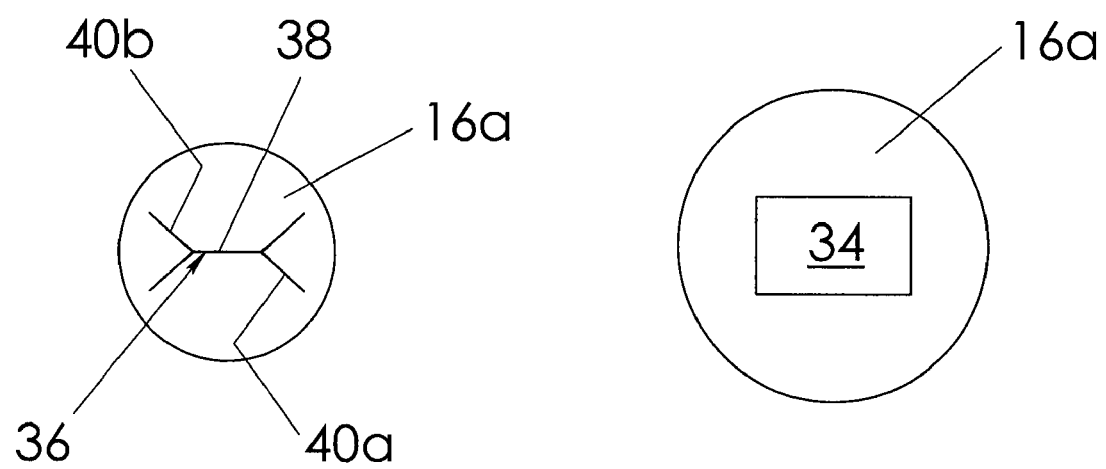
FIG. 4 is an end view of a bladder of the connector of FIG. 1 illustrating the bladder in a closed position.
FIG. 5 is an end view of a bladder as shown in FIG. 4 but illustrating the bladder in an open position.
Figure 6:
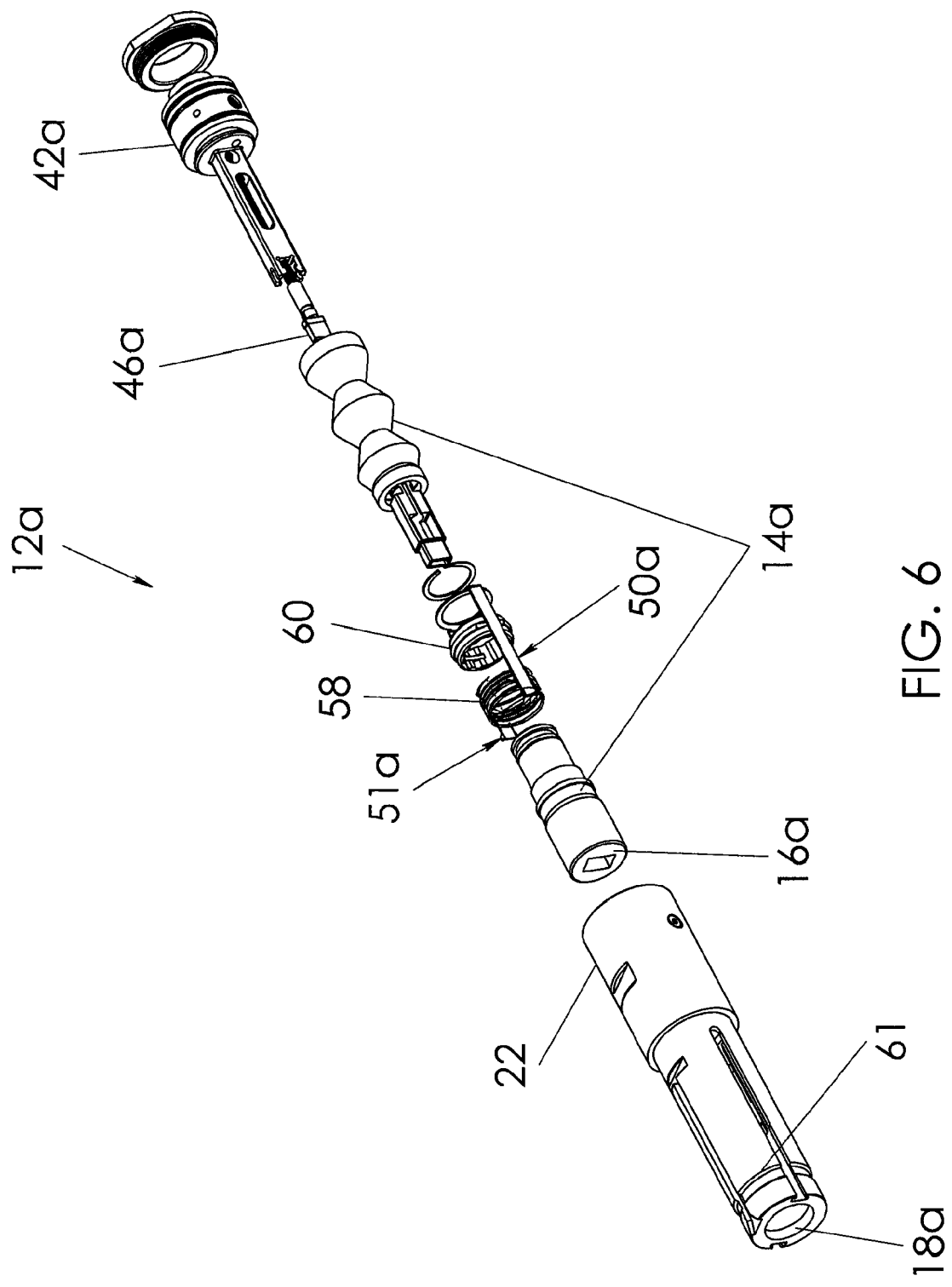
FIG. 6 is a perspective, exploded view of the parts of the first connector portion of the connector of FIG. 1.
Figure 7:
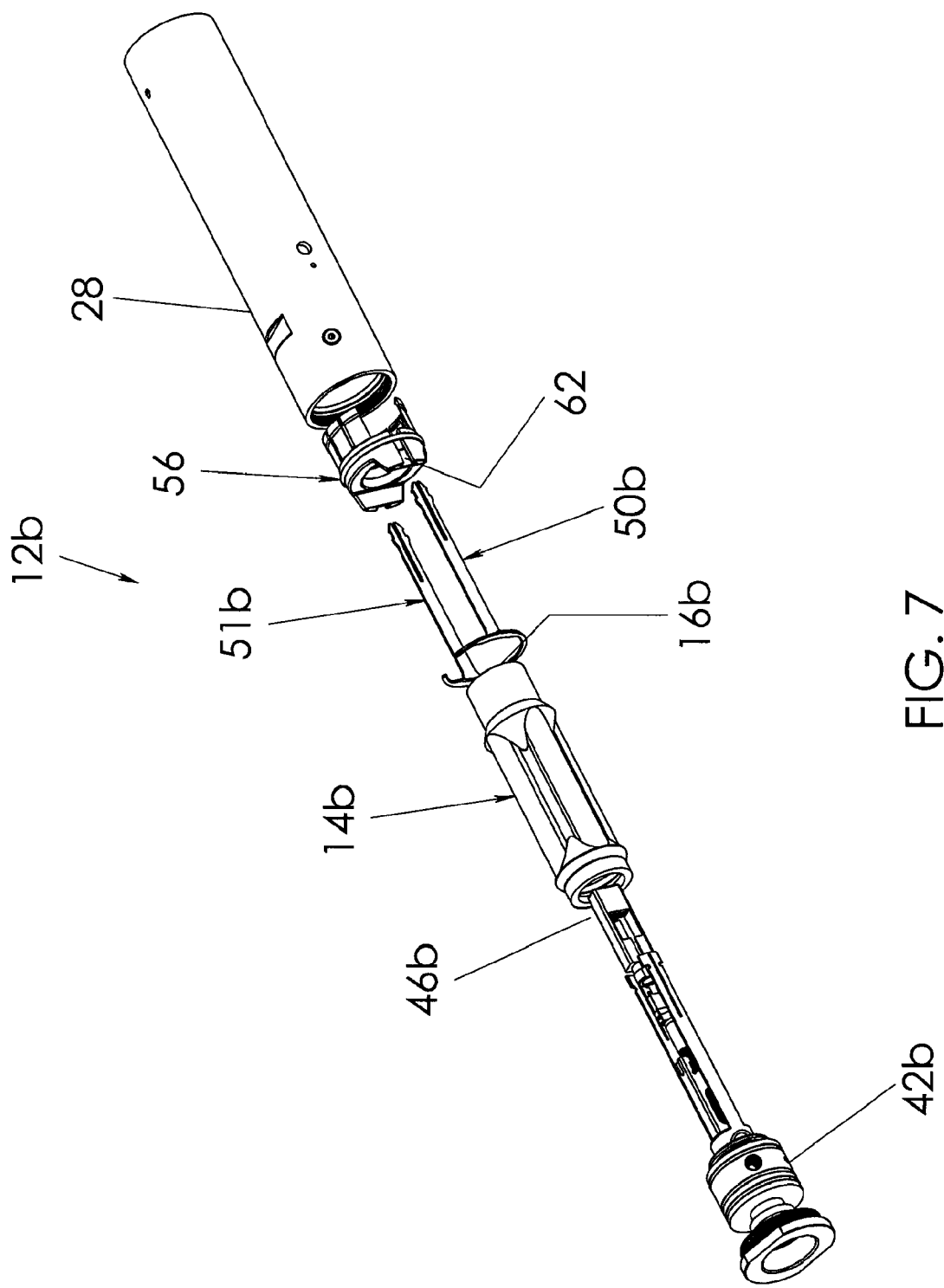
FIG. 7 is a side perspective, exploded view of the parts of the second connector portion of the connector of FIG. 1.

The first connector portion 12a comprises a first tubular shell 22 including interior portions defining a fixed frustoconical constriction 24 terminating in the first circular constriction 18a as shown perhaps best in FIG. 3. The second connector portion 12b illustratively includes a second tubular shell 28 and an actuator 30 slidable therein and defining a slidable frustoconical constriction 32 terminating in the second circular constriction 18b. The sliding frustoconical constriction 32 is in an extended position in shell 28 in the unmated condition of FIG. 1, and the end portion 16a of bladder 14a is in the extended position of FIG. 1 when the connector portions are unmated. In the first or unmated, extended postion, the end portion 16a of bladder 14a is squeezed shut by the first circular constriction 18a of fixed frustoconical constriction 24, while the second circular constriction 18b of the extended actuator 30 squeezes the end portion 16b into a constricted, squeezed shut condition as illustrated in FIGS. 1 and 4. When the connector portions are moved into mating engagement, the forward end of shell 12a enters the open end of shell 12b, and the end faces of the bladder end portions 16a and 16b engage, while the forward end of shell 12a engages the end of the slidable actuator 30. Pushing the shell 12a inwardly beyond this position will cause the actuator 30 to be pushed back into the shell away from bladder end portion 16b, while the bladder end portion 16a is pushed reawardly by bladder end portion 16b, until both bladder end portion are located in a second position in an enlarged diameter portion of the shell bore, spaced inwardly from constriction 18a, as illustrated in FIG. 2. The first and second bladder end portions 16a, 16b are located in the interior of the first shell 22 spaced inwardly from the fixed constriction 18a when the first and second connector portions 12a, 12b are in the mated position of FIG. 2. In this mated position, the ends 16a, 16b of the first and second bladders 14a, 14b are in the expanded, open position of FIGS. 2 and 5. The ends of the bladder expand into this condition when released from the frustoconical constrictions 24 and 32 due to the shape memory of the bladder material, as described above.

The pattern of slits 36 is formed as the generally rectangular aperture 34 is squeezed by passage through the respective constriction as will be appreciated by those of skill in the art. The series of closed slits 36 illustratively comprises a medial closed slit 38 and a pair of diverging V-shaped closed slits 40a, 40b extending from opposite ends of the medial closed slit. Of course, other arrangements of slits are also contemplated as will be appreciated by those skilled in the art. The slits 36 and generally rectangular aperture 34 cooperate to provide an enlarged aperture through which more, and/or larger contacts, and/or generally rectangular contacts may pass when in the mated position, while still providing a tight environmental seal when in the unmated position, and during mating and unmating.

Continuing with the description of the basic components of the connector 10, each of the first and second connector portions 12a, 12b may comprise a respective base 42a, 42b, a tubular shell 44a, 44b extending outwardly from the base, and a mateable electrical and/or optical contact or contacts 46a, 46b carried by the base within a respective bladder 14a, 14b. Of course, the connector 10 may include both electrical and optical contacts in a hybrid arrangement. The connector 10 may further comprise a dielectric material 25, such as a dielectric oil, for example, contained within each of the first and second bladders 14a, 14b. The dielectric material fills the space in each bladder and prevents distortion or crushing that would otherwise occur when submerged due to the increased pressure as will be appreciated by those skilled in the art.

Those of skill in the art will also appreciate that the circular constriction feature of the connector 10 may be advantageously used in combination with the bladder generally rectangular aperture shape. In other embodiments, these features may be used independent of one another and still provide important advantages over prior art connectors. For example, the circular constriction may be used with bladder aperture shapes different from the generally rectangular shape. Conversely, the rectangular bladder aperture shape can be used with constrictions having shapes other than circular.

Referring now additionally to FIGS. 6-9, further advantageous aspects of the connector are now described. As an introduction, the connector 10 may include an interlocking assembly comprising first and second portions carried by respective connector portions 12a, 12b and being movable between a released position permitting the opposing ends 16a, 16b of the bladders 14a, 14b to move apart, and an interlocked position holding the opposing ends of the bladders together. In some embodiments, the interlocking assembly may hold the opposing ends 16a, 16b of the bladders 14a, 14b together with a substantially constant force as the opposing ends of the bladders move longitudinally together through the fixed frustoconical constriction and into larger diameter portion of shell 12a until the fully mated position of FIG. 2 is reached. At this point, bladder openings 34 move from the closed position to the open position, since the bladder end portions are no longer squeezed into the squeezed shut condition of FIG. 4. Alternatively or additionally, the interlocking assembly may hold the opposing ends 16a, 16b of the bladders 14a, 14b together with a substantially constant force as the opposing ends of the bladders move from the open position to the closed position while the bladder end portions move back into the unmated position of FIG. 1. The interlocking assembly returns the components to their original positions of FIG. 1 when unmating, as described in more detail below in connection with FIGS. 6 to 9.

Alternatively or additionally, the interlocking assembly of the connector 10 may provide a positive drawback between its first and second portions during movement from the interlocked position to the released position. The interlocking assembly may be moved to the interlocked position as the connector portions 12a, 12b are moved from the unmated to the mated position, and may be moved to the released position as the connector portions are moved from the mated to the unmated position.

The connector 10 illustratively comprises an interlocking assembly in the form of left and right, or two pairs of first and second interlocking tines 50a, 50b; 51a, 51b carried by respective first and second connector portions 12a, 12b on opposite sides of the connector. In other embodiments, a single tine or multiple tines may be used on only one of the connector portions as will be appreciated by those skilled in the art. The other connector portion may include one or more catches that cooperate with the tines, for example.

The interlocking assembly of the connector 10 may also comprise an initial arrestor for initially arresting movement of one of the bladders during initial engagement with an opposing end of the other of the bladders as the first and second connector portions 12a, 12b are moved from the unmated position to the mated position. In the illustrated embodiment, the initial arrestor is provided by a detent mechanism including the O-ring 60 carried within the first shell 22 and cooperating with a corresponding releasable engagement recess 61 on a medial internal surface of the first shell. The detent mechanism operates (disengages) at a predetermined point along a path of travel as the first and second connector portions 12a, 12b are moved from the unmated position to the mated position as will be appreciated by those of skill in the art. Those of skill in the art will appreciate other equivalent mechanisms may also provide the initial arrestor.

The connector 10 further comprises a spring 58 operatively connected between the end 16a of the first bladder 14a and the ring 60 of the detent mechanism for providing a desired sealing force to the opposing ends 16a, 16b of the first and second bladders 14a, 14b. Once the tines 50a, 50b; 51a, 51b are brought together and interlocked, the detent mechanism can release while the spring 58 still provides the needed sealing force between the bladder ends. This arrangement, in combination with the operation of the tines 50a, 50b; 51a, 51b, permits a smaller spring to be used thereby making mating less awkward, while still providing an adequate sealing force. Now it is the tines 50a, 50b; 51a, 51b that return the components to their original positions when unmating, and not the large springs required in the prior art connectors. There are several main advantages achieved. One is that debris cannot overcome the limited spring force previously available to return the components to their unmated positions. Second, the fact-to-face force on the opposed bladder ends may be constant, pre-selected and controlled over the entire mate/unmate cycle. In other words, the connector 10 may have a minimal mating force and need not rely entirely on springs to return the moveable components from their mated to unmated positions.

Figure 8:
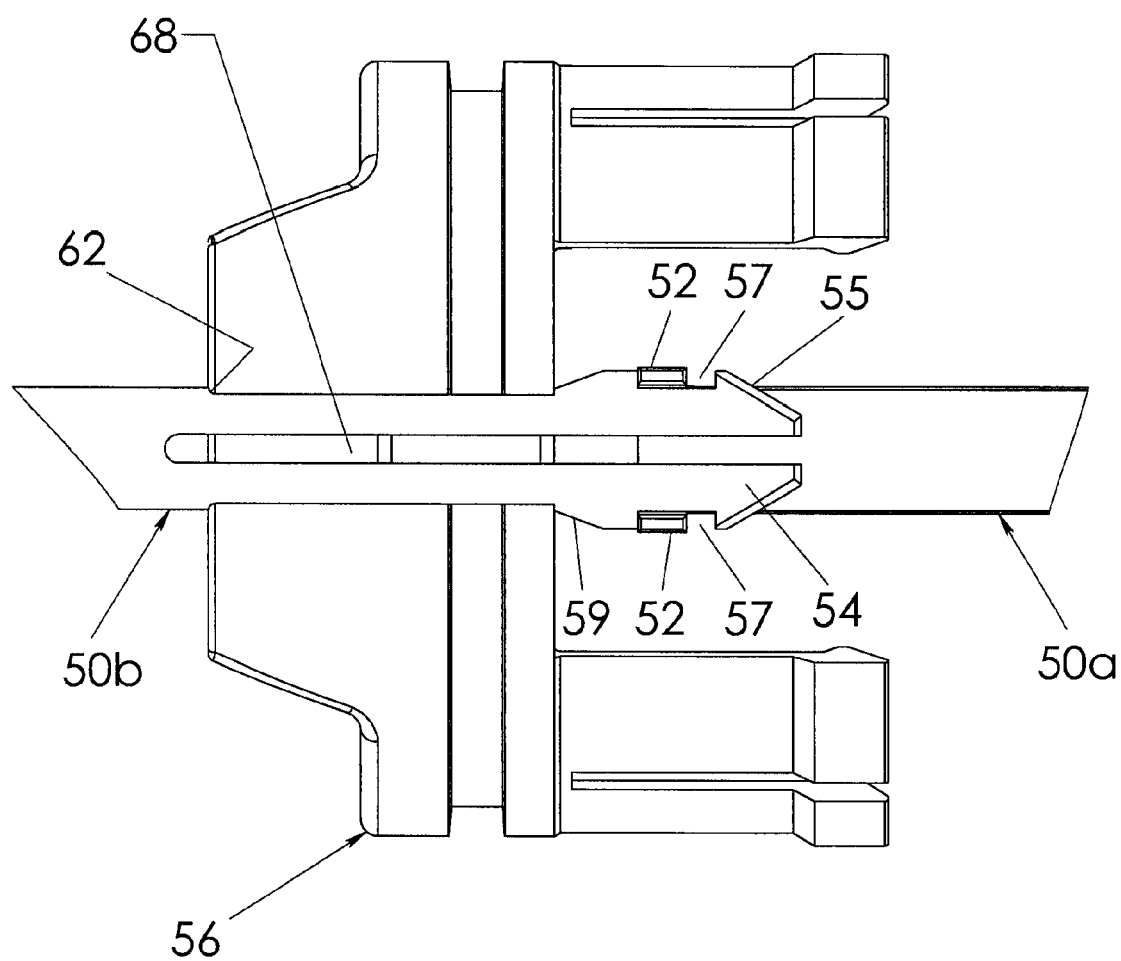
FIG. 8 is a side elevational view of a portion of the tines of FIGS. 6 and 7 in the interlocked position.
Figure 9:
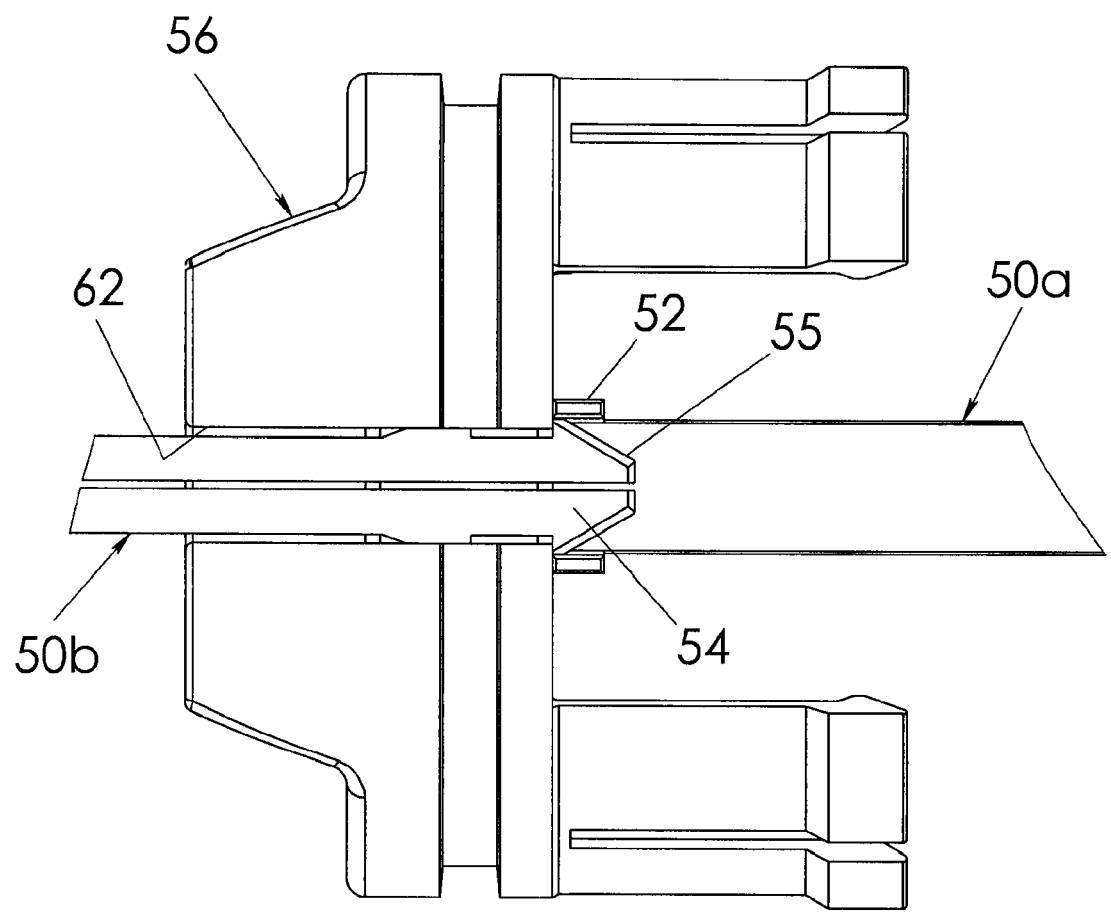
FIG. 9 is a side elevational view of a portion of the tines of FIGS. 6 and 7 illustrated as moving to the released position.

When the connector portions 12a, 12b are moved from the mated to unmated position, the tines 50a, 50b; 51a, 51b move from the interlocked position (FIG. 8) that holds the opposing ends 16a, 16b of the first and second bladders 14a, 14b together, to the released position (FIG. 9) that permits the opposing ends of the first and second bladders to move apart, as described in greater detail below Only one pair of the interlocking tines 50a, 50b is illustrated in FIGS. 8 and 9 and the other pair of tines have a similar structure and operation as will be appreciated by those skilled in the art.

The second connector portion 12b illustratively includes a plug throat 56 (FIGS. 7-9), provided as part of the actuator 30 (FIGS. 1 and 2), and carried within the second shell 28 that moves the tines 50b, 51b from the interlocked position to the released position as the first and second connector portions 12a, 12b are moved from the mated position to the unmated position. More particularly, describing just one side of the plug throat 56 for clarity of explanation, it has a channel 62 through which the slotted body of the tine 50b passes.

The distal end of the tine 50a terminates in the form of a female catch defined by a pair of outwardly extending tabs 52. The cooperating tine 50b terminates in the form of a male catch defined by an enlarged head 54 with tapered leading and trailing edges 55, 59 and opposing tab-receiving notches 57 therein. A longitudinal slot 68 also extends through the enlarged head 54 to permit its squeezing during release as described further below. As will be appreciated by those skilled in the art, the tapered leading edge 55 engages the tabs 52, squeezing together the enlarged head 54 until the tabs become engaged in the notches 57. At this point the detent mechanism above can release permitting further movement of the connector portions 12a, 12b together.

To release the tines 50a, 50b the trailing edge 59 of the enlarged head 54 engages a channel 62 formed in the plug throat 56. The channel 62 is sized to pass the body of the tine and squeeze the tine as the enlarged head 54 enters the channel. As seen in FIG. 9, the enlarged head 54 is squeezed as the tine 50b moves relatively into the channel 62 in the direction as indicated. The tabs 52 may contact the throat plug 56 to complete separation from the male catch as will be appreciated by those skilled in the art. An important feature is that there is an outward stop against which the outward motion of the bladder seal is arrested as it is drawn into the demated position. When it hits the stop, the rearward portion or the assembly continues to be drawn forward further compressing the spring until the spring reaches another hard stop. That ensures that the seal is not left just short of its full travel before the tines 50a, 50b; 51a, 51b disengage.

The interlocking assembly may eliminate the strong springs of the prior art connectors, may ensure positive drawback not provided in the prior art connectors, and may ensure that the face-to-face sealing force between the bladder ends remains adequate during demating which was not positively provided in prior art connectors which instead had a decreasing force to the point where the ends actually separated if friction made spring-induced throat return difficult. The connector 10 may also enjoy a predetermined and constant face-to-face force of the bladder ends at all times which was also not provided in the prior art.

A method aspect of the invention is directed to making a connector 10. The method may include forming first and second bladders 14a, 14b to be positioned in respective first and second connector portions 12a, 12b and cooperating therewith so that the opposing ends 16a, 16b of the first and second bladders are urged together and moved from a closed to an open position as the first and second connector portions are moved from an unmated to a mated position. The method may further include forming the first and second connector portions 12a, 12b to be movable between the unmated and mated positions and so that at least one of the first and second connector portions defines a circular constriction 18a, 18b for closing an end 16a, 16b of a respective bladder 14a, 14b into a circular peripheral shape 20 when the first and second connector portions are in the unmated position.

Another method aspect of the invention is for making a connector 10 comprising forming first and second bladders 14a, 14b to be carried by respective first and second connector portions 12a, 12b. The method further comprises forming the interlocking assembly comprising respective first and second portions and being movable between the released position and the interlocked position as described herein.

Other features and advantages of the connector are disclosed in copending patent application entitled "CONNECTOR INCLUDING INTERLOCKING ASSEMBLY AND ASSOCIATED METHODS", attorney docket no. 60113, the entire contents of which are incorporated herein by reference. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A connector comprising:
   first and second connector portions being movable between unmated and mated conditions;
   first and second bladders in respective first and second connector portions, each bladder having an end portion having an aperture which communicates with a chamber in the bladder in an open condition, at least one of the ends of said first and second bladders defining a generally rectangular aperture when in the open position;
   the first and second bladders cooperating with the connector portions so that opposing ends of said first and second bladders are urged together and at least one bladder end portion is moved from a first position to a second position as said first and second connector portions are moved from the unmated position to the mated position; and
   at least one of said first and second connector portions defining a circular constriction which constricts the end portion of the respective bladder into a closed position in which the aperture is sealed shut when said first and second connector portions are in the unmated position;
   the end portions of the bladders being spaced from the circular constriction in the mated position whereby the bladder end portion is released and expands into an open position in which the aperture is open to allow communication with the chamber in the bladder.

2. A connector according to claim 1 wherein said first connector portion comprises a first tubular shell including interior portions defining a fixed frustoconical constriction terminating in a first circular constriction.

3. A connector according to claim 1 wherein said second connector portion comprises a second tubular shell and an actuator slidable therein and defining a slidable frustoconical constriction terminating in a second circular constriction; and wherein said second bladder extends longitudinally beyond said slidable and fixed frustoconical constrictions and into the interior of said first shell in said second position in which said first and second bladder end portions are released and free to expand into an open position.

4. A connector according to claim 1 wherein each of said first and second connector portions comprises a base, a tubular shell extending outwardly from said base, and at lease one mateable contact carried by said base within a respective bladder.

5. A connector according to claim 1 further comprising a dielectric material contained within each of said first and second bladders.

6. A connector comprising:
   first and second connector portions being movable between unmated and mated conditions;
   first and second bladders in respective first and second connector portions, each bladder having an end portion having an aperture which communicates with a chamber in the bladder in an open condition;

the first and second bladders cooperating with the connector portions so that opposing ends of said first and second bladders are urged together and at least one bladder end portion is moved from a first position to a second position as said first and second connector portions are moved from the unmated position to the mated position; and at least one of said first and second connector portions defining a circular constriction which constricts the end portion of the respective bladder into a closed position in which the aperture is sealed shut when said first and second connector portions are in the unmated position, at least one of the ends of said first and second bladders defining a series of closed slits when in the closed position;

the end portions of the bladders being spaced from the circular constriction in the mated position whereby the bladder end portion is released and expands into an open position in which the aperture is open to allow communication with the chamber in the bladder.

7. A connector according to claim 6 wherein said series of closed slits comprises a medial closed slit and a pair of diverging V-shaped closed slits extending from opposite ends of said medial closed slit.

8. A connector comprising:
first and second connector portions being movable between unmated and mated positions;
first and second bladders in respective first and second connector portions, each bladder having an end portion which is in a closed condition when the connector portions are in the unmated position and in an open condition when the connector portions are in the mated position, at least one of the ends of said first and second bladders defining a generally rectangular aperture when in the open condition;
said first connector portion comprising a first tubular shell including interior portions defining a fixed frustoconical constriction terminating in a first circular construction which has a diameter less than that of the first bladder end portion in the open condition and which constricts the end portion of said first bladder into a constricted, reduced diameter circular peripheral shape comprising said closed condition when said first and second connector portions are in the unmated position; and
said second connector portion comprising a second tubular shell and an actuator slidable therein and defining a slidable frustoconical constriction terminating in a second circular constriction which has a diameter less than that of the second bladder end portion in the open condition and which constricts the end portion of said second bladder into a constricted, reduced diameter circular peripheral shape comprising said closed condition when said first and second connector portions are in the unmated position.

9. A connector according to claim 8 wherein said second bladder extends longitudinally beyond said slidable and fixed frustoconical constrictions and into the interior of said first shell when said first and second connector portions are in the mated position so that said first and second bladders are in the open condition.

10. A connector according to claim 8 wherein each of said first and second connector portions comprises a base, a tubular shell extending outwardly from said base, and at least one mateable contact carried by said base within a respective bladder.

11. A connector according to claim 8 further comprising a dielectric material contained within each of said first and second bladders.

12. A connector comprising:
first and second connector portions being movable between unmated and mated positions; and
first and second bladders in respective first and second connector portions, each bladder having an end portion which is in a closed condition when the connector portions are in the unmated position and in an open condition when the connector portions are in the mated position, at least one of the ends of said first and second bladders defining a series of closed slits when in the closed condition;
said first connector portion comprising a first tubular shell including interior portions defining a fixed frustoconical constriction terminating in a first circular construction which has a diameter less than that of the first bladder end portion in the open condition and which constricts the end portion of said first bladder into a constricted, reduced diameter circular peripheral shape comprising said closed condition when said first and second connector portions are in the unmated position;
said second connector portion comprising a second tubular shell and an actuator slidable therein and defining a slidable frustoconical constriction terminating in a second circular constriction which has a diameter less than that of the second bladder end portion in the open condition and which constricts the end portion of said second bladder into a constricted, reduced diameter circular peripheral shape comprising said closed condition when said first and second connector portions are in the unmated position.

13. A connector according to claim 12 wherein said series of closed slits comprises a medial closed slit and a pair of diverging V-shaped closed slits extending from opposite ends of said medial closed slit.

14. A connector comprising:
first and second connector portions being movable between unmated and mated positions; and
first and second bladders in respective first and second connector portions and cooperating therewith so that opposing ends of said first and second bladders are urged together and moved relative to said connector portions from a first to a second position, as said first and second connector portions are moved from the unmated position to the mated position, the bladders having ends which each have an aperture there through and being movable between a released, open position in which said aperture is open and a constricted, closed position in which said aperture is sealed shut;
said first and second connector portions each defining a constriction for constricting an end of a respective bladder into the closed position when said first and second connector portions are in the unmated position; and
at least one of the apertures being generally rectangular when in the open position and defining a series of closed slits when in the closed position.

15. A connector according to claim 14 wherein said first connector portion comprises a first tubular shell including interior portions defining a fixed frustoconical constriction terminating in a first circular end constriction.

16. A connector according to claim 15 wherein said second connector portion comprises a second tubular shell and an actuator slidable therein and defining a slidable frustoconical constriction terminating in a second circular end constriction; and wherein said second bladder extends longitudinally beyond said slidable and fixed frustoconical constrictions and into the interior of said first shell when said first and second connector portions are in the mated position so that the ends of said first and second bladders are in the open position.

17. A connector according to claim 14 wherein said series of closed slits comprises a medial closed slit and a pair of diverging V-shaped closed slits extending from opposite ends of said medial closed slit.

18. A connector according to claim 14 wherein each of said first and second connector portions comprises a base, a tubular shell extending outwardly from said base, and at least one mateable contact carried by said base within a respective bladder.

19. A connector according to claim 14 further comprising a dielectric material contained within each of said first and second bladders.

20. A method for making a connector comprising:
   forming first and second bladders to be positioned in respective first and second connector portions and cooperating therewith so that opposing ends of the first and second bladders are urged together and move from a first position to a second position relative to said connector portions as the first and second connector portions are moved from an unmated position to a mated position; and
   forming the first and second connector portions to be movable between the unmated and mated positions and so that at least one of the first and second connector portions defines a circular constriction for closing an end of a respective bladder into a constricted circular peripheral shape in which an aperture in the bladder end is in a closed position when the first and second connector portions are in the unmated position, at least one of the ends of the first and second bladders having a generally rectangular aperture when in an open position.

21. A method according to claim 20 wherein the first connector portion comprises a first tubular shell including interior portions defining a fixed frustoconical constriction terminating in a first circular constriction.

22. A method according to claim 20 wherein the second connector portion comprises a second tubular shell and an actuator slidable therein and defining a slidable frustoconical constriction terminating in a second circular constriction; and wherein the second bladder extends longitudinally beyond the slidable and fixed frustoconical constrictions and into the interior of the first shell when the first and second connector portions are in the mated position, the first and second bladder ends being in an open position in which apertures in the respective bladder ends are open when the connector portions are in the mated position.

23. A method according to claim 20 wherein each of the first and second connector portions comprises a base, a tubular shell extending outwardly from the base, and at least one mateable contact carried by the base within a respective bladder.

24. A method for making a connector comprising:
   forming first and second bladders to be positioned in respective first and second connector portions and cooperating therewith so that opposing ends of the first and second bladders are urged together and move from a first position to a second position relative to said connector portions as the first and second connector portions are moved from an unmated position to a mated position; and
   forming the first and second connector portions to be movable between the unmated and mated positions and so that at least one of the first and second connector portions defines a circular constriction for closing an end of a respective bladder into a constricted circular peripheral shape in which an aperture in the bladder end is in a closed position when the first and second connector portions are in the unmated position, at least one of the ends of the first and second bladders defining a series of closed slits when in the closed position.

25. A method according to claim 24 wherein the series of closed slits comprises a medial closed slit and a pair of diverging V-shaped closed slits extending from opposite ends of the medial closed slit.

26. A method for making a connector comprising:
   forming a first and second bladders to be positioned in respective first and second connector portions and cooperating therewith so that opposing ends of the first and second bladders are urged together and apertures in the opposing ends move between a closed, sealed shut position and an open position as the first and second connector portions are moved from an unmated position to a mated position, and so that at least one opposing end defines a generally rectangular aperture when in the open position and defines a series of closed slits when in the closed position.

27. A method according to claim 26 wherein the first connector portion comprises a first tubular shell including interior portions defining a fixed frustoconical constriction terminating in a first circular end constriction, and the first circular end constriction constricts the first bladder end to close said first end aperture when the connector portions are unmated.

28. A method according to claim 27 wherein the second connector portion comprises a second tubular shell and an actuator slidable therein and defining a slidable frustoconical constriction terminating in a second circular end constriction which constricts the second bladder end aperture into the closed position when the connector portions are unmated; and wherein the second bladder extends longitudinally beyond the slidable and fixed frustoconical constrictions and into the interior of the first shell when the first and second connector portions are in the mated position so that the first and second bladder ends are released and adopt the open position.

29. A method according to claim 26 wherein the series of closed slits comprises a medial closed slit and a pair of diverging V-shaped closed slits extending from opposite ends of the medial closed slit.

30. A method according to claim 26 wherein each of the first and second connector portions comprises a base, a tubular shell extending outwardly from the base, and at least one mateable contact carried by the base within a respective bladder.

* * * * *